March 24, 1925.　　　　W. G. MACHUNZE　　　　1,531,013
DEMOUNTABLE RIM
Filed Aug. 11, 1923　　　2 Sheets-Sheet 1
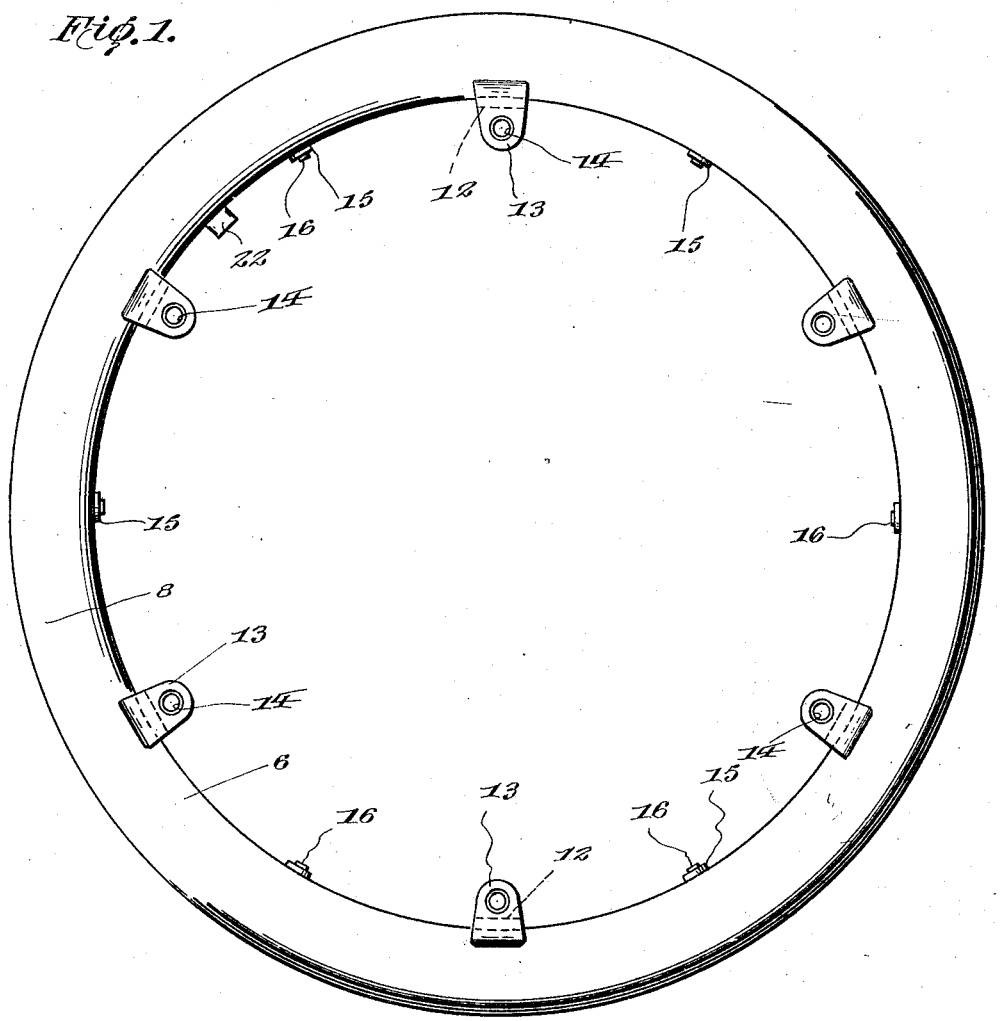
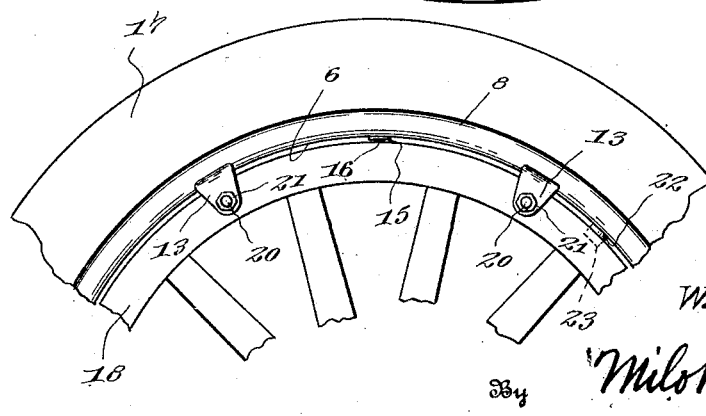

March 24, 1925. 1,531,013
W. G. MACHUNZE
DEMOUNTABLE RIM
Filed Aug. 11, 1923  2 Sheets-Sheet 2

Inventor:
W. G. Machunze.
By Milo B. Stevens & Co,
Attorneys.

Patented Mar. 24, 1925.

1,531,013

UNITED STATES PATENT OFFICE.

WILLIAM G. MACHUNZE, OF RICHMOND HILL, NEW YORK.

DEMOUNTABLE RIM.

Application filed August 11, 1923. Serial No. 656,797.

*To all whom it may concern:*

Be it known that I, WILLIAM G. MACHUNZE, a citizen of the United States, residing at Richmond Hill, in the county of Queens and State of New York, have invented new and useful Improvements in Demountable Rims, of which the following is a specification.

This invention relates to wheel rims and more particularly to improvements in demountable or detachable rims for supporting automobile tires.

The rims employed at the present time comprises a single annular section having means for attachment to the wheel. While this rim is a decided improvement over the long discarded rim permanently secured to the wheel, yet it represents no development in so far as the placement of the tire on said rim is concerned.

The primary object of the invention resides in the provision of a rim comprising two separable sections to which the tire may be fitted or removed without the usual arduous task of clamping or prying the tire over the flanged portion of the rim.

A further object of the invention resides in improved means for locking the sections in their assembled relation and additional means to render their placement together easy and positive.

A still further object is to provide a tire rim that is simple in construction, inexpensively manufactured, and efficient in use.

With these objects in view, together with others which will appear as the description proceeds, the invention consists in the novel construction, combination and arrangement of parts, all as will be described more fully hereinafter, attention being directed to the accompanying two sheets of drawings, illustrating the same, in which like characters refer to the same parts in the several views, and in which:

Figure 1 is an elevation of my improved rim and illustrating certain means for securing the rim to the automobile wheel.

Fig. 4 is a fragmentary side elevation showing the rim and its tire mounted on a wheel.

Figures 2, 3:
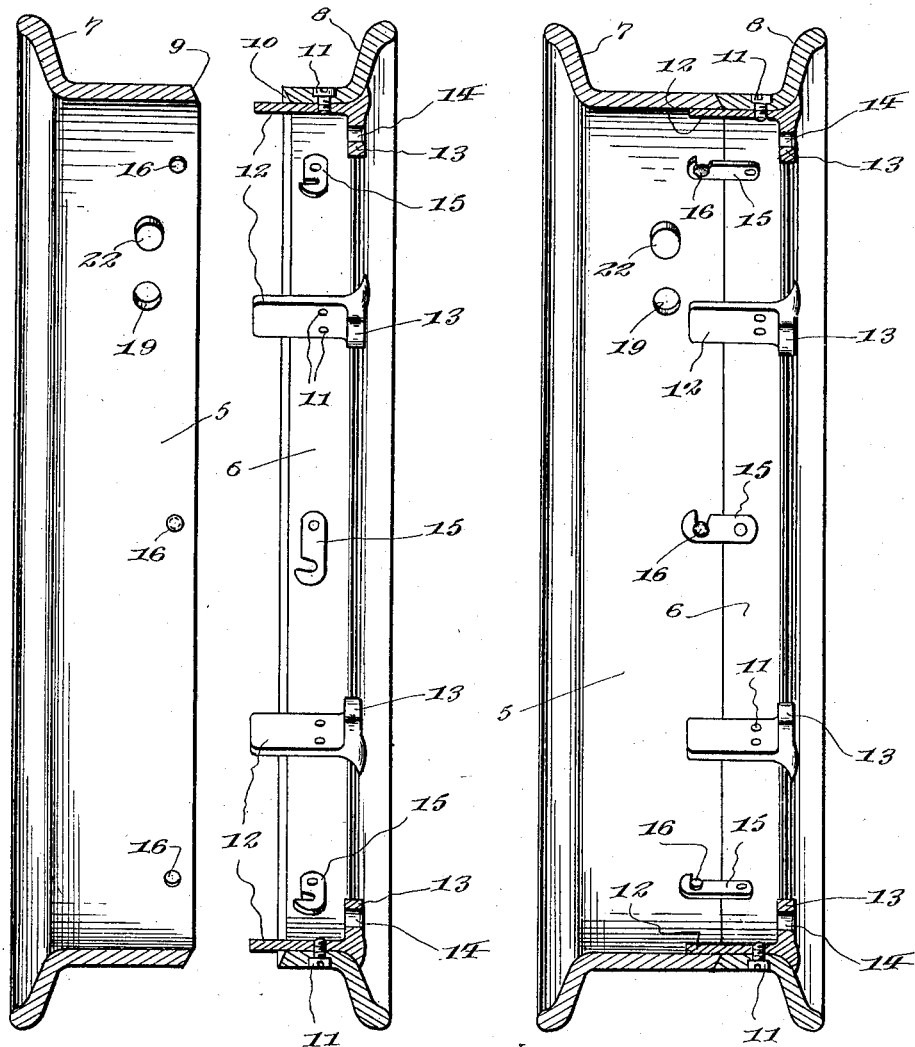
Fig. 2 is a diametric cross-section through the rim illustrating the two sections spaced apart ready for assembling.
Fig. 3 is a similar view showing the sections in assembled relation.

Referring now more specifically to the accompanying drawings, my rim comprises two separable sections 5 and 6, of ring formation, the section 5 by preference being the wider of the two, both being provided with flanges 7 and 8 respectively for the obvious purpose of holding sides of the tire. The inner edges of the sections 5 and 6 are beveled as shown at 9 and 10.

Suitably secured to the rim section 6, as indicated at 11, are a plurality of inwardly directed fingers 12, said fingers extending a short distance beyond the beveled edge 10 of section 6 and beneath section 5, as clearly shown in Fig. 3.

Each finger 12 is provided with an angular thickened extension 13 directed toward the center of the rim and having an aperture 14 for the purpose of receiving certain studs when mounting the rim in place on the wheel, as will be pointed out hereinafter. Preferably these fingers extend a short distance on the flange 8, being shaped to snugly fit the latter and thereby adding to the rigidity of said fingers.

For the purpose of preventing relative lateral separation of the rim sections, I provide locking means in the form of a plurality of latches 15, pivotally mounted on the inner side of section 6, which are adapted to hook under the headed studs 16 on section 5, as best shown in Fig. 3.

Figure 4 of the drawings illustrates my rim assembled with its tire 17 and mounted on the wheel 18.

In placing said tire on the rim the sections 5 and 6 are separated and the tire with its tube is slipped on the section 5, the stem of the tube having been inserted in the opening 19 in section 5. Section 6 is now assembled with its companion section 5, the fingers 12 fitting beneath the inner side thereof, as best shown in Fig. 3. The latches 15 are now hooked into the headed studs 16 firmly binding said sections together, the sides of the tire being clinched between the flanges 7 and 8. The tire is now inflated, whereupon the sides thereof expand outwardly exerting a certain amount of pressure on said flanges 7 and 8 tending to cause a slight separation of the rim sections thereby binding the headed studs 16 within the hooked end of said latches 15. Thus, lateral separation and peripheral slippage of the rim sections is avoided. The rim and its tire may now be mounted on the wheel by inserting the studs 20 of the wheel through the apertures 14 of the angular extension 13, whereupon the usual nuts 21 are applied. The apertures 14 are countersunk to receive the nuts 21, as in practice it is customary to slightly convex the inner surface of the latter. The rim may also be provided with an inwardly directed stud 22 to fit into a recess 23 of the wheel, as shown in Fig. 4.

In removing the tire from the rim it is only necessary to give the hooked end of the latches 15 a sharp blow to release them from the headed stud 16. The section 6 may then be parted from its companion section and the tire pulled bodily from the rim. Particular attention is directed to the fact that the wide section 5 of the rim is prevented from being forced inwardly in a radial direction by the extended portions of the attaching plates 12. That is to say, as the section 5 is considerably wider than the section 6, it is not so able to withstand strain and for this reason the attaching portions 12 of the lugs extend beyond the section 6 into overlapping relation with the section 5 and thereby brace the same against inward radial movement. Also the beveled contact between the sections 5 and 6 prevent the wide section 5 from being moved outwardly with relation to the narrow section 6.

The invention is susceptible of modification and the embodiment hereinbefore set forth and shown in the drawings is, therefore, to be considered as illustrative, rather than restrictive, of the scope of the invention.

Having thus described my invention, I claim as new and desire to secure by Letters Patent:

A rim comprising wide and narrow sections having their opposed sides beveled and snugly in contact with each other, lugs having attaching plates rigidly secured to said narrow section and extending beyond the same into overlapping relation with said wide section to limit inward movement of the inner edge portion of the wide section, the beveled contact between the wide and narrow sections constituting a means to hold the inner edge of the wide section against outward movement and latches connecting the sections, the inner portions of said attaching plates being free from locking engagement with the wide section.

In testimony whereof I affix my signature.

WILLIAM G. MACHUNZE.